(No Model.)

F. DWORSHAK.
FEEDER AND CUTTER FOR THRASHING MACHINES.

No. 480,254. Patented Aug. 9, 1892.

Witnesses.
A. Ruppert,
H. A. Daniels

Inventor.
Fred Dworshak
Per
Thomas P. Simpson
Atty

UNITED STATES PATENT OFFICE.

FRED DWORSHAK, OF BEAVER FALLS, MINNESOTA.

FEEDER AND CUTTER FOR THRASHING-MACHINES.

SPECIFICATION forming part of Letters Patent No. 480,254, dated August 9, 1892.

Application filed January 2, 1892. Serial No. 416,765. (No model.)

*To all whom it may concern:*

Be it known that I, FRED DWORSHAK, a citizen of the United States, residing at the town of Beaver Falls, in the county of Renville and State of Minnesota, have invented certain new and useful Improvements in Feeders and Cutters for Thrashing-Machines; and I do hereby declare the following to be a full, clear, and exact description of the invention, such as will enable others skilled in the art to which it appertains to make and use the same.

This invention relates to machines for feeding grain to the thrashing-machine and for cutting the bundle-bands and spreading the grain while being fed; and it consists in certain improvements in the construction of such machines, as hereinafter set forth and claimed.

Figure 1:
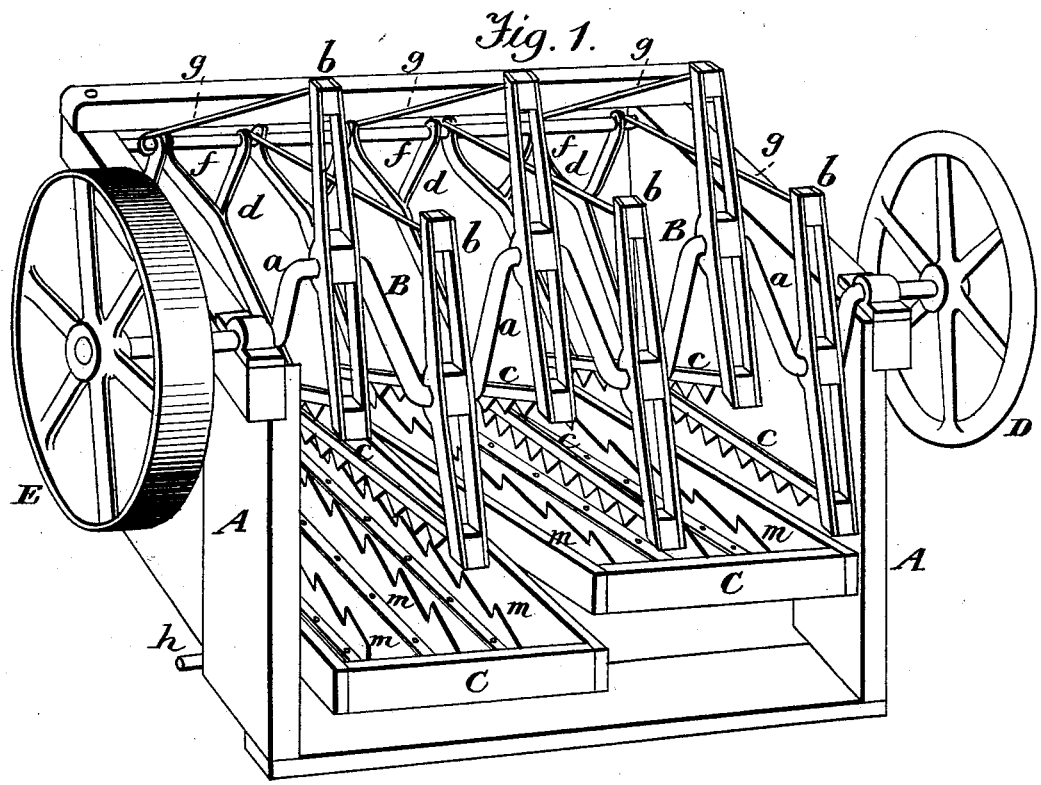
Figure 2:
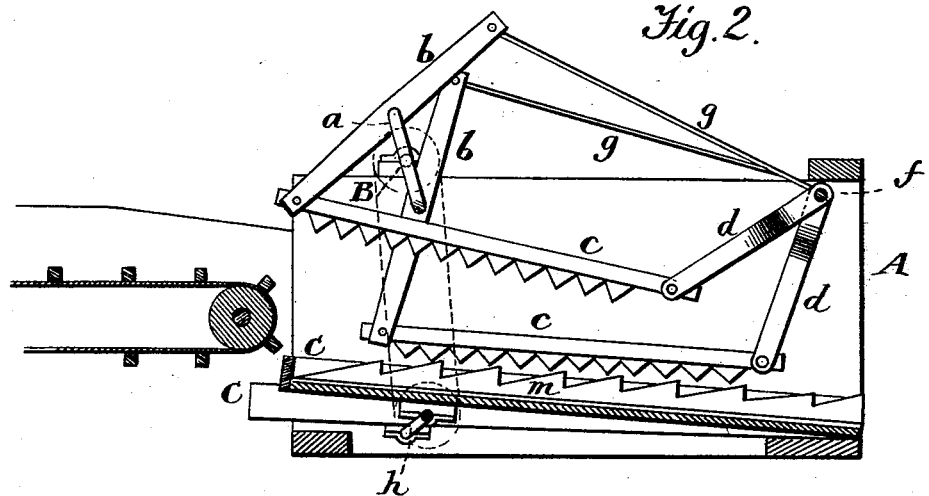

In the accompanying drawings, Figure 1 represents a perspective view of a feeding and cutting machine provided with my improvements. Fig. 2 is a vertical longitudinal section of the same.

In the main frame A is mounted a crank-shaft B, which is formed with a series of cranks $a$, which extend alternately forward and rearward from the line of said shaft. Pivotally connected with each crank $a$ is a rocking lever or holder $b$. To the lower ends of the holders $b$ are secured the forward ends of the cutters $c$, which are provided with teeth which are in form like the teeth of a reaping-machine. The rear ends of the cutters $c$ are connected with the hangers $d$, which are pivotally connected with the frame or with a bar $f$, extending across the same. To the upper ends of the pivoted holders $b$ are attached the rods $g$, the rear ends of which are connected with the bar $f$ at the rear. Under the cutters $c$ are placed the feeding-tables C, the said tables being connected with and actuated by a crank-shaft $h$, which is constructed to give said tables alternately a longitudinal vibrating movement. The tables C are provided with the fixed notched blades $m$, constructed to take the grain to the mouth of the thrashing-machine. A fly-wheel D is mounted on one end of the crank-shaft B, and on the opposite end of said shaft is a band-wheel E, with which driving mechanism may be connected. Motion may be imparted from the shaft B to the crank-shaft $h$ by suitable gearing connecting said shafts.

As will be seen from the construction described, by the rotation of the shaft B the cutters are brought forward and are raised as they move forward and descend on their movement rearward, the forward and upward movement being enhanced by the action of the pivoted holders $b$, the upper ends of which are detained by the rods $g$, causing said holders to turn on their pivotal bearings. The bundles of grain, being cast on a carrier in position leading to the feeding-tables, are conveyed by the latter to the mouth of the thrashing-machine. During the passage of the grain the bundles are cut up and spread by the cutters, which also assist in the feeding movement.

I claim—

1. In a feeding and cutting machine for thrashing-machines, a rotative shaft provided with a series of cranks, a series of rocking levers pivotally connected with said cranks, a number of cutters connected at their forward ends with said levers, pivoted hangers with which the rear ends of said cutters are connected, rods connected with said levers and with a rear cross-bar, and operating mechanism, substantially as and for the purposes described.

2. The combination, with a main frame, of a shaft provided with a series of cranks, pivoted holders $b$, secured on said shaft, cutters $c$, connected at their forward ends with said holders, hangers $d$, connected with said cutters, rods connected with said holders and with a cross-bar, one or more vibrating tables mounted under said cutters, and driving mechanism, substantially as set forth and described.

In testimony whereof I have affixed my signature in presence of two witnesses.

FRED DWORSHAK.

Witnesses:
GEO. L. EVANS,
EMIL KNEUZLI.